ALKYLATION-TRANSALKYLATION PROCESS
Filed Aug. 15, 1968
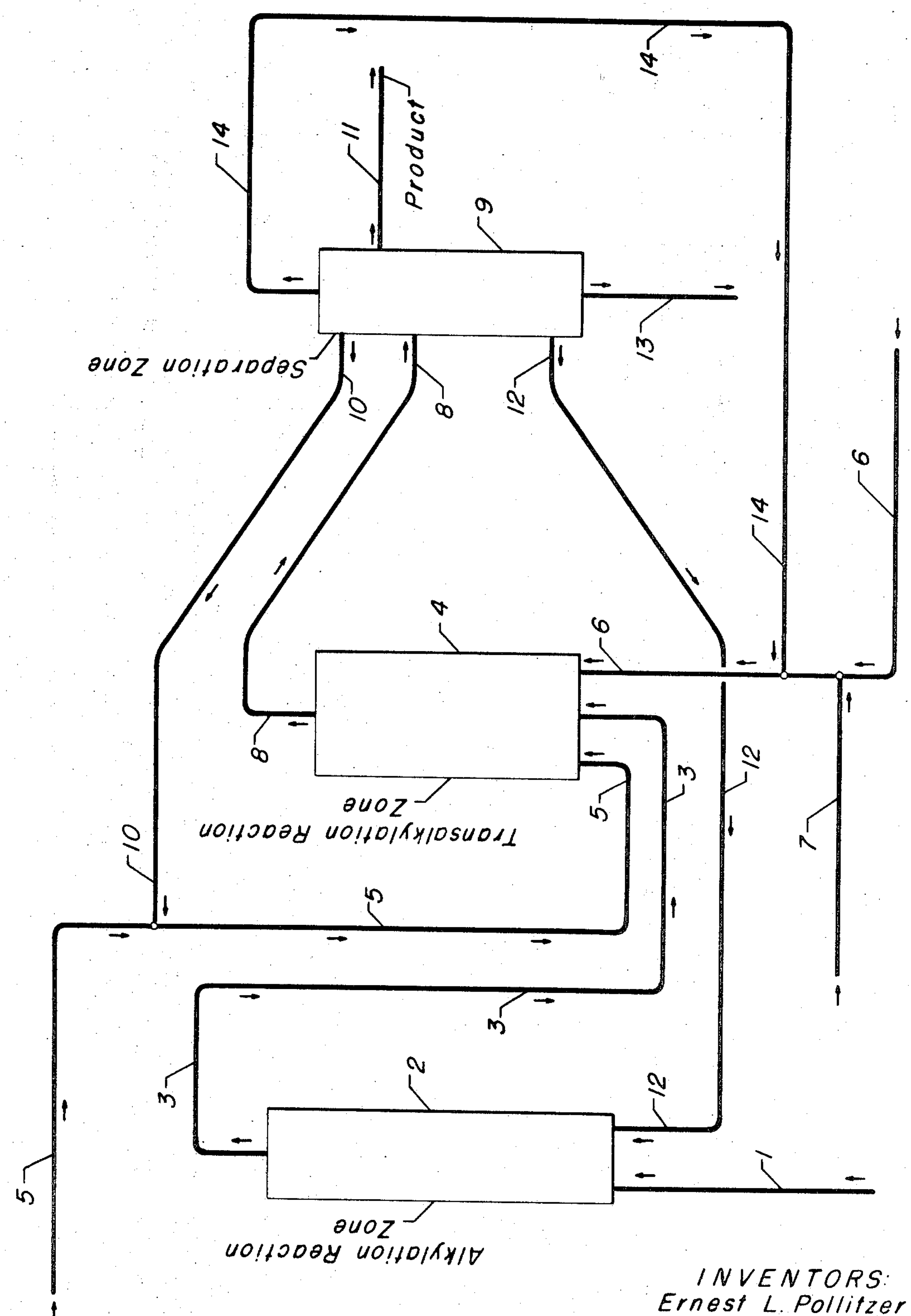
INVENTORS:
Ernest L. Pollitzer
George R. Donaldson
Richard C. Hawkins
BY: James R. Hoatson, Jr.
Joseph C. Mason, Jr.
ATTORNEYS 3,551,510
Patented Dec. 29, 1970

3,551,510
ALKYLATION-TRANSALKYLATION PROCESS

Ernest L. Pollitzer, Skokie, George R. Donaldson, Barrington, and Richard C. Hawkins, McHenry, Ill., assignors to Universal Oil Products Company, Des Plaines, Ill., a corporation of Delaware Filed Aug. 15, 1968, Ser. No. 764,363
Int. Cl. C01b *33/28;* C07c *3/50, 3/58*
U.S. Cl. 260—672 6 Claims

ABSTRACT OF THE DISCLOSURE

An alkyl aromatic compound is produced utilizing the the steps of alkylation, transalkylation and separation.

This invention relates to a process for the production of an alkyl aromatic compound. More specifically, this invention relates to a process for the production of an alkyl aromatic compound including the steps of alkylation, transalkylation and separation.

An object of this invention is to provide a process for the production of an alkyl aromatic hydrocarbon such as ethylbenzene, said ethylbenzene being a desired chemical intermediate utilizable in large quantities in dehydrogenation processes for the manufacture of styrene, one of the starting materials for the production of resins and some synthetic rubber. Still another object of this invention is a process for the production of cumene whereby the cumene product can be subsequently oxidized in large quantities to form cumene hydroperoxide which is readily decomposed into phenol and acetone.

One embodiment of this invention relates to a process for the production of an alkyl aromatic compound which comprises passing to an alkylation reaction zone containing an alkylation catalyst, an olefin-acting compound, and polyalkyl aromatic compound, reacting said olefin-acting compound with said polyalkyl aromatic compound at alkylation conditions, passing the effluent from said alkylation zone along with aromatic compound to a transalkylation reaction zone containing a transalkylation catalyst, reacting said alkylation zone effluent with said aromatic compound at transalkylation conditions, passing the transalkylation reaction zone effluent to a separation zone, separating from the separation zone unreacted aromatic compound, desired monoalkylated aromatic compound and higher molecular weight polyalkylated aromatic compound, recycling at least a portion of said unreacted aromatic compound to said transalkylation reaction zone, recycling at least a portion of said polyalkylated aromatic compound to said alkylation zone, and removing the desired alkyl aromatic compound as product from the process.

A more specific embodiment of the present invention relates to a process for the production of ethylbenzene which comprises passing to an alkylation zone containing a solid phosphoric acid alkylation catalyst ethylene and a mixture of diethylbenzene and triethylbenzene, reacting said ethylene with such diethylbenzene and triethylbenzene at alkylation conditions, passing the effluent from said alkylation zone along with benzene, hydrogen and a chloride-containing component to a transalkylation reaction zone containing a hot, concentrated hydrochloric-acid extracted mordenite transalkylation catalyst, reacting said alkylation zone effluent with said benzene, hydrogen and chloride-containing component at transalkylation conditions, passing the transalkylation reaction zone effluent to a separation zone, separating from the separation zone benzene, hydrogen, hydrogen chloride, desired ethylbenzene and higher molecular weight polyethylbenzenes, recycling at least a portion of said unreacted benzene, hydrogen and hydrogen halide to said transalkylation reaction zone, recycling at least a portion of said polyethylbenzenes to said alkylation zone, and removing the desired ethylbenzene as product from the process.

Other objects and embodiments will be found in the following further detailed description of our invention.

This invention can be most clearly described and illustrated with reference to the attached drawing which illustrates specific embodiment of our invention. While of necessity, certain limitations must be present in such a schematic description, no intention is meant thereby to limit the generally broad scope of this invention.

As stated hereinabove, the first step of the process of the present invention comprises passing to an alkylation reaction zone containing an alkylation catalyst, an olefin-acting compound, and polyalkyl aromatic compound. In the drawing, this first step is represented as taking place in alkylation reaction zone 2 labeled alkylation reaction zone. The olefin-acting compound and polyalkyl aromatic compound must be furnished to this reaction zone. In the drawing, the olefin-acting compound is represented as being furnished to reaction zone 2 via line 1. The polyalkyl aromatic compound is represented as being furnished to reaction zone 2 via line 12, as hereinafter described.

The olefin-acting compound, particularly olefin hydrocarbon, which may be charged to reaction zone 2 via line 1 may be selected from diverse materials including monoolefins, diolefins, polyolefins, acetylenic hydrocarbons, and also alkyl halides, alcohols, ethers, and esters, the latter including the alkyl sulfates, alkyl phcsphates, and various esters of carboxylic acids. The preferred olefin-acting compounds are olefinic hydrocarbons which comprise monoolefins containing one double bond per molecule. Monoolefins which may be utilized as olefin-acting compounds in the process of the present invention are either normally gaseous or normally liquid and include ethylene, propylene, 1-butene, 2-butene, isobutylene, and the higher molecular weight normally liquid olefins such as the various pentenes, hexenes, heptenes, octenes, and mixtures thereof, and still higher molecular weight liquid olefins, the latter including various olefin polymers having from about nine to about eighteen carbon atoms per molecule including propylene trimer, propylene tetramer, propylene pentamer, etc. Cycloolefins such as cyclopentene, methylcyclopentene, cyclohexene, methylcyclohexene, etc., may also be utilized, although not necessarily with equivalent results. Also included within the scope of the term olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include the various alkyl fluorides such as methyl fluoride, n-propyl fluoride, isopropyl fluoride, n-butyl fluoride, etc. the various alkyl chlorides, alkyl bromides, etc. As stated hereinabove other esters such as the alkyl sulfates including ethyl sulfate, propyl sulfate, etc., and alkyl phosphates including ethyl phosphate, etc. may be utilized. Ethers such as diethyl ether, ethyl propyl ether, dipropyl ether, etc. are also included within the generally broad scope of the term olefin-acting compound and may be successfully utilized as alkylating agents in the process of this invention.

The process of this invention may be successfully applied to and utilized for complete conversion of olefin hydrocarbons when these olefin hydrocarbons are present in minor quantities in various gas streams. Thus, the olefin-acting compound, and preferably, the olefinic hydrocarbon for use in the process of this invention need not be concentrated. Such olefinic hydrocarbons appear in minor quantities in various refinery gas streams, usually diluted with gases such as hydrogen, nitrogen, methane, ethane, propane, etc. These normally gaseous olefinic hydrocarbon streams containing minor quantities of olefin hydrocarbons are obtained in petroleum refineries from various refinery installations including thermal cracking units, catalytic cracking units, thermal reforming units, coking units, polymerization units, dehydrogenation units, etc. Many of such refinery gas streams have in the past often been burned for fuel value. This is particularly true for refinery gas streams known as off-gas streams containing relatively minor quantities of olefin hydrocarbons such as ethylene. A typical analysis, in mole percent, for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7%; and $C_4$ hydrocarbons, 0.5%. It is readily observed that the total olefin content of this gas stream is 16.7 mole percent and the ethylene content is even lower, namely 10.3%. Such gas streams containing olefin hydrocarbons in minor or dilute quantities are particularly preferred for use within the broad scope of this invention. It is also readily apparent that only the olefin content of such streams undergoes reaction at the alkylation conditions of the process, and that the remaining gases free from olefin hydrocarbons are vented from the process.

As stated hereinabove, the olefin-acting compound is passed to alkylation reaction zone 2 via line 1 and in said alkylation zone, the olefin-acting compound and polyalkyl aromatic compound via line 12, as hereinafter described, are reacted at alkylation conditions with an alkylation catalyst.

Alkylation reaction zone 2 is of the conventional type with an alkylation catalyst disposed therein in the reaction zone. The alkylation zone may be equipped with heat transfer means, baffles, trays, heating means, etc. The alkylation reaction zone is preferably of the adiabatic type and thus feed to the alkylation zone will preferably be provided with the requisite amount of heat prior to passage thereof to said alkylation zone.

The alkylation reaction zone contains an alkylation catalyst. A particularly preferred alkylation catalyst comprises a solid phosphoric acid-containing composite. The phosphoric acid-containing composite may be made by combining an acid of phosphorus such as pyro-, or tetraphosphoric acid with the solid support. It is not intended to infer that the different acids of phosphorus which may be employed will produce catalysts which have identical effects upon any given alkylation reaction as each of the catalysts produced from different acids and by slightly varying procedures will exert its own characteristic action.

Triphosphoric acid, which may be represented by the formula $H_5P_3O_{10}$, may also be used as one of the starting materials for the preparation of the phosphoric acid-containing composite utilized in the alkylation reaction zone of this invention.

A phosphoric acid mixture which is generally referred to as polyphosphoric acid may also be employed in manufacturing the composite. Polyphosphoric acid is formed by heating orthophosphoric acid or pyrophosphoric acid or mixtures thereof in suitable equipment such as carbon lined trays heated by flue acids or other suitable means to produce a phosphoric acid mixture generally analyzing from about 79% to about 85% by weight $P_2O_5$.

Tetraphosphoric acid, having the general formula $H_6P_4O_{13}$ which corresponds to the double oxide formula $3H_2O \cdot 2P_2O_5$ may be considered as the acid resulting when three molecules of water are lost by four molecules of orthophosphoric acid, $H_3PO_4$. The tetraphosphoric acid may be manufactured by gradual or controlled dehydration or heating of orthophosphoric acid and pyrophosphoric acid or by adding phosphorus pentoxide to those acids in proper amounts.

The phosphoric acid-containing composite may comprise a high surface area solid support. By the term high surface area is meant a surface area measured by surface adsorption techniques within a range of about 25 to about 500 or more square meters per gram and preferably a support having a surface area of approximately 100 to 300 square meters per gram. Therefore, satisfactory supports for the preparation of catalysts for use in the process of this invention include high surface area crystalline alumina modifications such as gamma-, eta- and theta-alumina, although these are not necessarily of equivalent suitability. In addition to the aforementioned gamma-, eta-, and theta-aluminas which may be utilized as solid supports, it is also contemplated that other refractory oxides, and mixtures thereof, such as silica, zirconia, magnesia, thoria, etc. silica-alumina, silica-magnesia, alumina-silica-magnesia, alumina-thoria, alumina-zirconia, etc. may also be utilized as solid supports for the alkylation catalyst of the process of the present invention.

The phosphoric acid-containing composite utilized in alkylation reaction zone 2 may contain from about 8% or lower to about 80% or higher, by weight, of phosphoric acid, and preferably from about 10% to about 75% by weight of phosphoric acid.

In addition to the solid phosphoric acid alkylation catalyst which may be utilized in our alkylation reaction zone 2, it is also contemplated that other alkylation catalysts such as a boron halide-modified refractory inorganic oxide catalyst as well as the various crystalline aluminosilicate alkylation catalysts may also be utilized in our alkylation-transalkylation process.

The conditions utilized in alkylation reaction zone 2 may be varied over a relatively wide range. Thus, the desired alkylation reaction in the presence of the solid phosphoric acid catalysts, for example, may be effected at a temperature of from about 0° to 350° C. or higher, and preferably from about 0° to about 325° C. The alkylation reaction is usually carried out at a pressure from about atmospheric to about 200 atmospheres or more. The pressure utilized is usually selected to maintain the polyalkyl aromatic compound in substantially liquid phase. The liquid hourly space velocity will be maintained in the range of from about 0.1 to about 20 and preferably in the range of from about 1.0 to about 15.

When the alkylation reaction has proceeded to the desired extent, preferably with 100% conversion of the olefin-acting compound, the product (which may comprise both the reacted and unreacted materials) from the alkylation zone, which may be termed alkylation zone effluent, is withdrawn from alkylation reaction zone 2 via line 3 and passed to transalkylation reaction zone 4. Transalkylation reaction zone 4 is of the conventional type with a transalkylation catalyst disposed therein in the reaction zone. This reaction zone may also be equipped with heat transfer means, baffles, trays, heating means, etc. The transalkylation reaction zone is preferably of the adiabatic type and thus feed to the transalkylation zone will also be provided with the requisite amount of heat prior to passage thereof to said reaction zone.

As set forth hereinabove, the transalkylation reaction zone contains a transalkylation catalyst. A particularly preferred transalkylation catalyst comprises an acid-extracted crystalline aluminosilicate. It is especially preferred that the cystalline aluminosilicate be of the mordenite type. It has been found that, as contrasted with the prior art, the acid-extracted crystalline aluminosilicate catalyst, and especially the acid-extracted mordenite catalyst gave results definitely superior to what the art refers to as "acid-treated" mordenite catalysts, wherein the mordenite is only exchanged with a dilute mineral acid in order to replace cations with protons.

In the alkylation-transalkylation process of this invention, the mordenite, for example, is extracted with a hot, fairly concentrated acid, usually hydrochloric acid with the result that some alumina is actually removed from the lattice structure of the crystalline aluminosilicate. This acid-extracted mordenite catalyst has a higher silica alumina ratio than "acid-treated" mordenite and is a different catalytic structure than the so-called "acid-treated" mordenite alone. Further, by chemical analysis, the acid-extracted mordenite is a different composition of matter than the mordenite. In the preparation of these acid-extracted crystalline aluminosilicates, it is preferred to use mineral acids such as hydrochloric acid, phosphoric acid, aluminum chloride, sulfuric acid, and the like. However, the acid must be capable of removing alumina from the lattice structure of the crystalline aluminosilicate.

For example, hydrogen form mordenite having a silica to alumina ratio of about 15.8 can be acid-extracted with a hydrochloric acid solution maintained at a concentration of six moles of hydrochloric acid per mole of alumina present in the crystalline aluminosilicate. The mordenite can be contacted at temperatures in excess of 100° C. and preferably, in the range of from about 100° C. to about 110° C. Higher temperatures may, of course, be utilized at elevated pressures during this contacting procedure. The alumina extraction may be continued for a period of several hours, and preferably, for at least a six hour period after which time the acid-extracted mordenite is washed to remove excess chloride and then calcined at temperatures in the range of from about 200° C. to about 900° C. and preferably, in the range of from about 500° C. to about 750° C. A reduction in the alumina content of this acid-extracted mordenite of from 9.5 to at least 7.3 weight percent is achieved and the silica to alumina mole ratio is increased from 15.8 to at least 21.5 after the acid-extraction showing that alumina was actually removed from the lattice of the crystalline aluminosilicate. This acid-extracted mordenite catalyst has a higher silica to alumina ratio than the mordenite alone and is a particularly preferred transalkylation catalyst for use in the process of this invention.

As set forth hereinbefore, effluent from alkylation reaction zone 2 along with aromatic compound from line 5, as hereinafter described, as well as hydrogen and halogen-containing component via lines 6 and 7, as hereinafter described, are passed to transalkylation reaction zone 4 wherein said alkylation zone effluent is reacted with said aromatic compound, hydrogen, and halogen-containing component at transalkylation conditions including a temperature in the range from about 100° C. to about 500° C. or higher, and preferably, in the range of from about 125° C. to about 475° C. The transalkylation reaction is usually carried out at a pressure in the range from about atmospheric to about 200 atmospheres or more. The liquid hourly space velocity will be maintained in the range from about 0.1 to about 20 and preferably in the range of from about 1.0 to about 15.

As set forth hereinbefore, an aromatic compound is passed to transalkylation reaction zone 4 via line 5. Particularly preferred aromatic compounds for use in our invention are the benzene hydrocarbons and of the benzene hydrocarbons, benzene itself is particularly preferred for passage to our transalkylation reaction zone. However, it is also contemplated that higher molecular weight aromatic compounds including toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, normal propylbenzene, isopropylbenzene or cumene, normal butylbenzene, etc. as well as higher molecular weight aromatic hydrocarbons, including the hexylbenzenes, nonylbenzenes, dodecylbenzenes, pentadecylbenzenes, hexyltoluenes, nonyltoluenes, dodecyltoluenes, pentadecyltoluenes, etc. and mixtures thereof. Other suitable aromatic hydrocarbons which, at specified reaction conditions, depending upon the melting point of the aromatic chosen, would be in liquid form, would include those aromatic hydrocarbons with two or more aryl groups, such as diphenyl, diphenylmethane, and other polycyclic aromatics. Those aromatic hydrocarbons within the scope of this invention containing condensed aromatic rings would include naphthalene, the alkylnaphthalenes, anthracene, phenanthrene, naphthacene, rubrene, etc. As stated hereinbefore, of the aromatic compounds and preferably aromatic hydrocarbons for use via line 5 to transalkylation reaction zone 4, the benzene hydrocarbons are preferred, and of the benzene hydrocarbons, benzene itself is particularly preferred for use in our invention.

We have found, that in contradistinction to other alkylation-transalkylation process flow schemes, that when hydrogen in an amount of from about 2:1 to about 20:1 hydrogen to hydrocarbon mol ratio is present during, for example, the transalkylation of ethylbenzene, superior results are unexpectedly obtained with the acid-extracted crystalline aluminosilicate described hereinabove. These results are unexpected inasmuch as hydrogen, in comparison to the prior art, is not needed to keep, for example, a noble metal active catalytic site from carbon deposition inasmuch as there is no noble metal present on the catalyst utilized in the transalkylation portion of our combination process.

In our flow scheme, hydrogen is represented as being passed to transalkylation reaction zone 4 via line 6. In addition, via line 7 and line 6, halogen-containing component in an amount of from about 0.001 to about 2.0 wt. percent may be commingled with the hydrogen passing via line 6 for reaction in transalkylation reaction zone 4. It is also contemplated within the scope of this invention that the halogen-containing component may be added simultaneously with, but independently of, the hydrogen stream passing to transalkylation zone 4.

Of the preferred halogen-containing components are the halogens and the halogen halides, and of the halogens, a preferred halogen is chlorine, and of the halogen halides, it is particularly preferred to utilize hydrogen chloride. However, the particular catalyst utilized, as well as the particular alkylaromatic hydrocarbon to be transalkylated, will dictate the choice of the halogen-containing component utilized in our alkylation-transalkylation process.

When the transalkylation reaction has proceeded to the desired extent so that a sufficient quantity of polyalkylated compounds are converted to monoalkylated compounds by reaction with the aromatic compounds furnished to the reaction zone, the products from transalkylation reaction zone 4 are withdrawn through line 8 and passed to separation zone 9 for recovery of the desired components therefrom.

In separation zone 9, unreacted aromatic compound, hydrogen, hydrogen halide, desired monoalkylated aromatic compound, and higher molecular weight polyalkylated aromatic compounds are separated by means such as, for example, fractional distillation. The unreacted aromatic compound is passed from separation zone 9 via line 10 for recycle to transalkylation reaction zone 4 via line 5, thereby obtaining economy of operation.

Hydrogen and hydrogen halide are recycled from separation zone 9 via line 14 to transalkylation reaction zone 4 via line 6 so that the net consumption of hydrogen and halogen-containing component is kept at a minimum. The product of the process, namely, the alkylaromatic compound, is withdrawn from separation zone 9 via line 11. Polyalkylated aromatic compound is withdrawn from separation zone 9 via line 12 where at least a portion of said polyalkylated aromatic compound is recycled to alkylation reaction zone 2. The heavier molecular weight polyalkylaromatic compounds are removed from separation zone 9 via line 13 along with any high-boiling condensation products that may have formed and accumulated during the processing operation.

The following example illustrating a specific embodiment of this invention is introduced for purpose of illustration only with no intention of unduly limiting the generally broad scope of the present invention.

With reference to the drawing, alkylation reaction zone 2 is loaded with a solid phosphoric acid catalyst having an apparent bulk density of 0.92 gram per cc., a 22 lb. minimum crushing strength and containing at least 10% by weight of phosphoric acid. Ethylene is charged to alkylation reaction zone 2 via line 1 and ethylbenzene, initially, is charged to alkylation zone 2 via line 12 as hereinafter described. The alkylation reaction zone is maintained at about 300° C., 500 p.s.i.g., with a 2 liquid hourly space velocity based on ethylbenzene feed and at a 5:1 mol ratio of ethylbenzene to ethylene. The effluent from alkylation reaction zone 2 passing to transalkylation reaction zone 4 via line 3 is analyzed in line 3 and it is found that 95.5 to 96 wt. percent of the ethylene charged reacts. The analysis of this effluent stream, based on percent ethylene reacted is as follows: ethane and butane, trace; diethylbenzene, 76%; intermediate aromatic hydrocarbons between diethylbenzene and triethylbenzene, 5%; triethylbenzene, 12%; intermediate aromatic hydrocarbons between triethylbenzene and tetraethylbenzene, 1%; tetraethylbenzene, 2%; and $C_{16}+$ polyalkylaromatic hydrocarbons, 4%.

Transalkylation reaction zone 4 is loaded with a 1/16 inch hydrogen form acid-extracted mordenite catalyst having a silica to alumina ratio of approximately 21.5 after extraction utilizing concentrated hydrochloric acid. The transalkylation reactor is maintained at transalkylation reaction conditions including a 1.0 liquid hourly space velocity, 500 p.s.i.g. pressure and a temperature of 250° C. Benzene via line 5 and the alkylation reaction zone effluent via line 3 is reacted in the presence of from about 0.001 wt. percent chloride and in the presence of hydrogen in an amount of about 10 hydrogen-to-hydrocarbon mole ratio. The hydrogen is furnished to transalkylation reaction zone 4 via line 6 and the chloride, preferably in the form of tertiary butyl chloride is added to the transalkylation zone via lines 7 and 6. After the transalkylation has proceeded to the desired extent, the transalkylation reaction zone effluent is withdrawn via line 8 and passed to separation zone 9 which is a fractionation column. In separation zone 9, the unreacted benzene is returned to the transalkylation reaction zone via line 10. The hydrogen and hydrogen chloride formed in the transalkylation reaction is returned to line 6 for recycle to transalkylation reaction zone 4 via line 14. Ethylbenzene, as product from the process, is withdrawn from separation zone 9 via line 11. The diethylbenzene and heavier polyalkylaromatic hydrocarbons are separated in separation zone 9 wherein at least a portion of these hydrocarbons are returned via line 12 to alkylation reaction zone 2. The heaviest polyalkyl aromatic hydrocarbons are removed from the separation zone via line 13 and may be discarded, if desired. Analysis of the composition of transalkylation effluent stream 8 indicates that the composition, in weight percent, is as follows: benzene, 51.5%; ethylbenzene, 33%; diethylbenzene, 14%; triethylbenzene, 1%; $C_{16}+$ aromatic hydrocarbons, 0.5%.

Similar results are obtained utilizing our alkylation-transalkylation process when propylene or a butene or a refinery off-gas containing a minor quantity of olefin-acting compound such as ethylene, for example, is utilized as feed to alkylation reaction zone 2, via line 1.

We claim as our invention:

1. A process for the production of an alkyl aromatic compound which comprises passing to an alkylation reaction zone containing an alkylation catalyst, an olefin-acting compound and polyalkylaromatic compound, reacting said olefin-acting compound with said polyalkyl aromatic compound at alkylation conditions, passing the effluent from said alkylation zone along with aromatic compound to a transalkylation reaction zone containing a transalkylation catalyst, reacting said alkylation zone effluent with said aromatic compound at transalkylation conditions, passing the transalkylation reaction zone effluent to a separation zone, separating from the separation zone unreacted aromatic compound, desired monoalkylated aromatic compound and higher molecular weight polyalkylated aromatic compound, recycling at least a portion of said unreacted aromatic compound to said transalkylation reaction zone, recycling at least a portion of said polyalkylated aromatic compound to said alkylation zone, and removing the desired alkylaromatic compound as product from the process.

2. The process of claim 1 wherein said olefin-acting compound is an olefinic hydrocarbon, that said polyalkyl aromatic compound is a mixture of polyalkyl benzenes, that said alkylation catalyst comprises a solid phosphoric acid catalyst, that said alkylation conditions include a temperature of from about 0° to about 350° C., a pressure of from about atmospheric to about 200 atmospheres, a liquid hourly space velocity of from about 0.1 to about 20, that said aromatic compound passing to said transalkylation reaction zone is a benzene hydrocarbon, a halogen containing component in an amount of from about 0.001 weight percent to about 2.0 weight percent is added to the transalkylation zone, that said transalkylation catalyst comprises a hot, concentrated hydrochloric acid-extracted mordenite, that hydrogen is present in the transalkylation zone in an amount of from about 2:1 to about 20:1 hydrogen to hydrocarbon mole ratio, that said transalkylation conditions include a temperature in the range of from about 100° C. to about 500° C., a pressure in the range of from about atmospheric to about atmospheres, and a liquid hourly space velocity of from about 0.1 to about 20, that hydrogen halide suitable for recycle is separated from the separation zone, and that said desired alkylaromatic compound is a monoalkylated benzene hydrocarbon.

3. The process of claim 2 wherein said olefinic hydrocarbon is ethylene, that said mixture of polyalkylbenzene is a mixture of diethylbenzene and triethylbenzene, that said benzene hydrocarbon passing to said transalkylation reaction zone is benzene, that said halogen containing component is tertiary butyl chloride, that said acid-extracted crystalline aluminosilicate is a hot, concentrated hydrochloric acid-extracted mordenite, and that said desired monoalkylated benzene hydrocarbon is ethylbenzene.

4. The process of claim 2 wherein said olefinic hydrocarbon is propylene, that said mixture of polyalkylbenzenes is polypropylbenzenes, that said benzene hydrocarbon passing to said transalkylation zone is benzene, and that said desired monoalkylated benzene hydrocarbon is cumene.

5. The process of claim 2 wherein said olefinic hydrocarbon is a butene, that said mixture of polyalkylbenzenes are polybutylbenzenes, that said aromatic compound passing to said transalkylation reaction zone is benzene, and that said desired monoalkylated benzene hydrocarbon is butylbenzene.

6. The process of claim 2 wherein said olefinic hydrocarbon is a normally gaseous olefin comprising a refinery off-gas containing a minor quantity of ethylene, that said mixture of polyalkyl benzenes is polyethyl benzenes, that said benzene hydrocarbon passing to said transalkylation reaction zone is benzene, and that said desired monoalkylated benzene hydrocarbon is ethylbenzene.

References Cited

UNITED STATES PATENTS

| | | | |
|---|---|---|---|
| 3,183,233 | 5/1965 | Bloch | 260—671 |
| 3,200,163 | 8/1965 | Fenske | 260—671 |
| 3,250,728 | 5/1966 | Miale et al. | 252—455 |
| 3,281,483 | 10/1966 | Benesi et al. | 260—672 |
| 3,385,906 | 5/1968 | Kaufman | 260—671 |
| 3,442,794 | 5/1969 | Van Helden et al. | 208—111 |
| 3,480,539 | 11/1969 | Voorhies et al. | 208—111 |

DELBERT E. GANTZ, Primary Examiner

G. E. SCHMITKONS, Assistant Examiner

U.S. Cl. X.R.

252—442, 455; 260—671